US012689605B2

(12) United States Patent
Tylik et al.

(10) Patent No.: US 12,689,605 B2
(45) Date of Patent: Jul. 21, 2026

(54) NETWORK ADDRESS MAPPING FOR COMMUNICATIONS BETWEEN HOSTS AND STORAGE NODES IN DIFFERENT NETWORKS

(71) Applicant: Dell Products L.P., Round Rock, TX (US)

(72) Inventors: Dmitry Tylik, Westborough, MA (US); David L. Black, Acton, MA (US); Rivka Mayraz Matosevich, Zichron Ya'acov (IL)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 18/534,942

(22) Filed: Dec. 11, 2023

(65) Prior Publication Data

US 2025/0193146 A1     Jun. 12, 2025

(51) Int. Cl.
H04L 61/2557     (2022.01)
H04L 61/2514     (2022.01)
(Continued)

(52) U.S. Cl.
CPC ...... H04L 61/2557 (2013.01); H04L 61/2514 (2013.01); H04L 61/4541 (2022.05); H04L 67/1097 (2013.01)

(58) Field of Classification Search
CPC ............. H04L 61/2557; H04L 61/4541; H04L 67/1097
See application file for complete search history.

(56) References Cited

U.S. PATENT DOCUMENTS

2007/0239944 A1* 10/2007 Rupanagunta ...... G06F 11/2005
                                                        711/147
2014/0365680 A1* 12/2014 van Bemmel ............ H04L 9/40
                                                        709/232
(Continued)

OTHER PUBLICATIONS

Dell Technologies, "NVMe, NVMe/TCP, and Dell SmartFabric Storage Software Overview," IP San Solution Primer, Technical Guide, H18917, Jan. 2022, 60 pages.
(Continued)

*Primary Examiner* — Angela Widhalm De Rodriguez
(74) *Attorney, Agent, or Firm* — Ryan, Mason & Lewis, LLP

(57) ABSTRACT

An apparatus in an illustrative embodiment comprises at least one processing device that includes a processor coupled to a memory. The at least one processing device is configured to determine, as part of a network discovery process for a host device operating in a first network which accesses a storage node operating in a second network, a network address mapping data structure comprising mappings between a first set of network addresses in the first network and a second set of network addresses in a second network. The at least one processing device is also configured to associate at least one of the mappings with an identifier of the host device, to obtain and modify communications to be exchanged between the host device and the storage node based on the network address mapping data structure, and to provide the modified communications to an inter-network link between the first and second networks.

20 Claims, 8 Drawing Sheets

(51) Int. Cl.
　　 *H04L 61/4541* 　　　　(2022.01)
　　 *H04L 67/1097* 　　　　(2022.01)

(56) References Cited

U.S. PATENT DOCUMENTS

| | | | |
|---|---|---|---|
| 2018/0198879 A1* | 7/2018 | Jalan | H04L 69/161 |
| 2020/0081640 A1* | 3/2020 | Enz | G06F 13/4027 |
| 2020/0241890 A1* | 7/2020 | Mallick | G06F 9/44505 |
| 2020/0409893 A1* | 12/2020 | Puttagunta | H04L 69/16 |
| 2023/0109231 A1* | 4/2023 | Adogla | H04L 41/40 |
| | | | 709/223 |

OTHER PUBLICATIONS

Dell Technologies, "NVMe/TCP and SmartFabric Storage Software," NVMe IP San Solution Brief, Aug. 2023, 3 pages.
Dell Technologies, "Dell PowerFlex," Spec Sheet, May 2023, 14 pages.
Dell Technologies, "Dell EMC PowerFlex Software-Defined Storage for Modern Datacenters," Solution Brief, H18397, Jun. 2020, 3 pages.
A. Ali et al., "Securely Access Services Over AWS PrivateLink," AWS Whitepaper, Jun. 3, 2021, 30 pages.
M. Chadalapaka et al., "Internet Small Computer System Interface (ISCSI) Protocol (Consolidated)," Internet Engineering Task Force, Request for Comments: 7143, Apr. 2014, 295 pages.

* cited by examiner

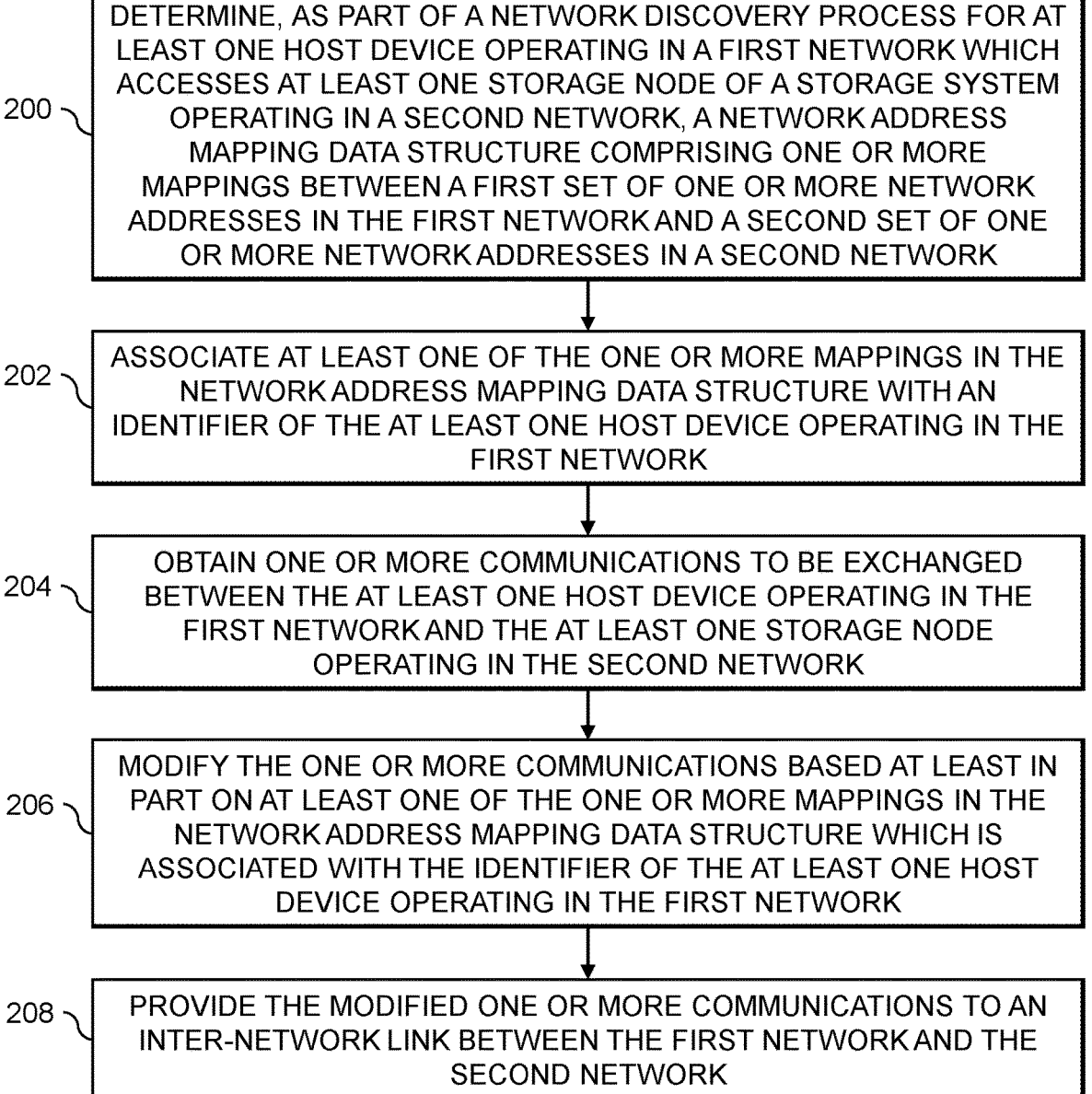

200 — DETERMINE, AS PART OF A NETWORK DISCOVERY PROCESS FOR AT LEAST ONE HOST DEVICE OPERATING IN A FIRST NETWORK WHICH ACCESSES AT LEAST ONE STORAGE NODE OF A STORAGE SYSTEM OPERATING IN A SECOND NETWORK, A NETWORK ADDRESS MAPPING DATA STRUCTURE COMPRISING ONE OR MORE MAPPINGS BETWEEN A FIRST SET OF ONE OR MORE NETWORK ADDRESSES IN THE FIRST NETWORK AND A SECOND SET OF ONE OR MORE NETWORK ADDRESSES IN A SECOND NETWORK

202 — ASSOCIATE AT LEAST ONE OF THE ONE OR MORE MAPPINGS IN THE NETWORK ADDRESS MAPPING DATA STRUCTURE WITH AN IDENTIFIER OF THE AT LEAST ONE HOST DEVICE OPERATING IN THE FIRST NETWORK

204 — OBTAIN ONE OR MORE COMMUNICATIONS TO BE EXCHANGED BETWEEN THE AT LEAST ONE HOST DEVICE OPERATING IN THE FIRST NETWORK AND THE AT LEAST ONE STORAGE NODE OPERATING IN THE SECOND NETWORK

206 — MODIFY THE ONE OR MORE COMMUNICATIONS BASED AT LEAST IN PART ON AT LEAST ONE OF THE ONE OR MORE MAPPINGS IN THE NETWORK ADDRESS MAPPING DATA STRUCTURE WHICH IS ASSOCIATED WITH THE IDENTIFIER OF THE AT LEAST ONE HOST DEVICE OPERATING IN THE FIRST NETWORK

208 — PROVIDE THE MODIFIED ONE OR MORE COMMUNICATIONS TO AN INTER-NETWORK LINK BETWEEN THE FIRST NETWORK AND THE SECOND NETWORK

FIG. 2

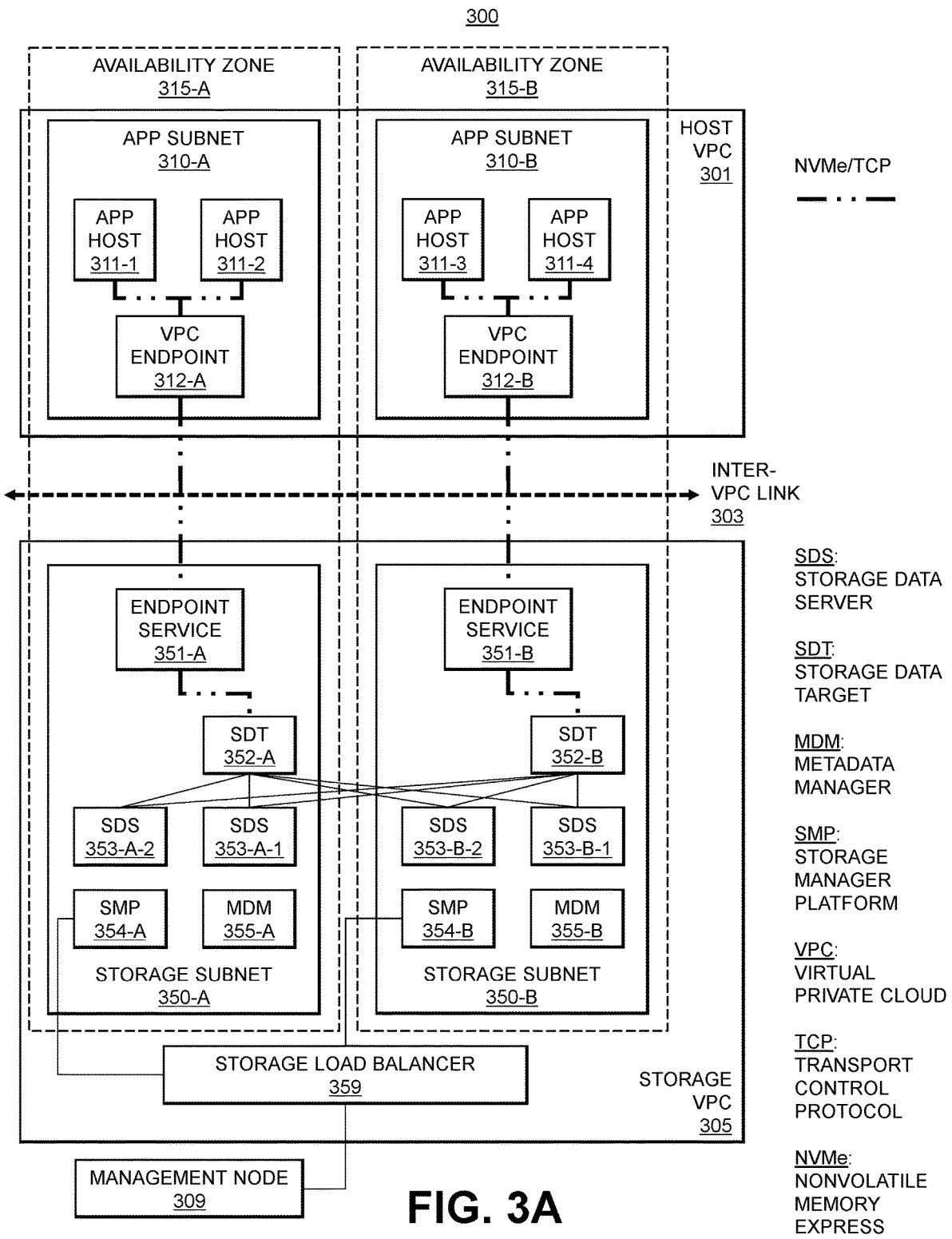

300

AVAILABILITY ZONE
315-A

AVAILABILITY ZONE
315-B

HOST
VPC
301

NVMe/TCP

APP SUBNET
310-A

APP SUBNET
310-B

APP
HOST
311-1

APP
HOST
311-2

APP
HOST
311-3

APP
HOST
311-4

VPC
ENDPOINT
312-A

VPC
ENDPOINT
312-B

INTER-
VPC LINK
303

ENDPOINT
SERVICE
351-A

ENDPOINT
SERVICE
351-B

SDT
352-A

SDT
352-B

SDS
353-A-2

SDS
353-A-1

SDS
353-B-2

SDS
353-B-1

SMP
354-A

MDM
355-A

SMP
354-B

MDM
355-B

STORAGE SUBNET
350-A

STORAGE SUBNET
350-B

STORAGE LOAD BALANCER
359

STORAGE
VPC
305

MANAGEMENT NODE
309

SDS:
STORAGE DATA
SERVER

SDT:
STORAGE DATA
TARGET

MDM:
METADATA
MANAGER

SMP:
STORAGE
MANAGER
PLATFORM

VPC:
VIRTUAL
PRIVATE CLOUD

TCP:
TRANSPORT
CONTROL
PROTOCOL

NVMe:
NONVOLATILE
MEMORY
EXPRESS

FIG. 3A

NETWORK ADDRESS MAPPING FOR COMMUNICATIONS BETWEEN HOSTS AND STORAGE NODES IN DIFFERENT NETWORKS

BACKGROUND

Information processing systems often include distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. For applications running on a host that utilizes the software-defined storage system, such a storage system provides a logical storage volume view to allow a given application to store and access data, without the application being aware that the data is being dynamically distributed among different storage nodes. In these and other distributed storage system arrangements, there may be issues related to network configurations for host to storage access, including for distributed storage system arrangements which implement advanced storage access protocols such as Non-Volatile Memory Express (NVMe) over Fabrics, also referred to as NVMe-oF, or NVMe over Transmission Control Protocol (TCP), also referred to as NVMe/TCP. Similar issues can arise with numerous other types of host environments.

SUMMARY

Illustrative embodiments provide techniques for network address mapping enabling communication between hosts and storage nodes in different networks, where network address translation is used for the communication between the different networks.

In one embodiment, an apparatus comprises at least one processing device comprising a processor coupled to a memory. The at least one processing device is configured to determine, as part of a network discovery process for at least one host device operating in a first network which accesses at least one storage node of a storage system operating in a second network, a network address mapping data structure comprising one or more mappings between a first set of one or more network addresses in the first network and a second set of one or more network addresses in a second network. The at least one processing device is also configured to associate at least one of the one or more mappings in the network address mapping data structure with an identifier of the at least one host device operating in the first network. The at least one processing device is further configured to obtain one or more communications to be exchanged between the at least one host device operating in the first network and the at least one storage node operating in the second network, to modify the one or more communications based at least in part on at least one of the one or more mappings in the network address mapping data structure which is associated with the identifier of the at least one host device operating in the first network, and to provide the modified one or more communications to an inter-network link between the first network and the second network.

These and other illustrative embodiments include, without limitation, apparatus, systems, methods and processor-readable storage media.

BRIEF DESCRIPTION OF THE DRAWINGS

FIG. 2 is a flow diagram of an exemplary process for enabling communication between hosts and storage nodes in different networks, where network address translation is used for the communication between the different networks, in an illustrative embodiment.

FIG. 3A shows a private cloud deployment of a storage system configured for network address translation functionality in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
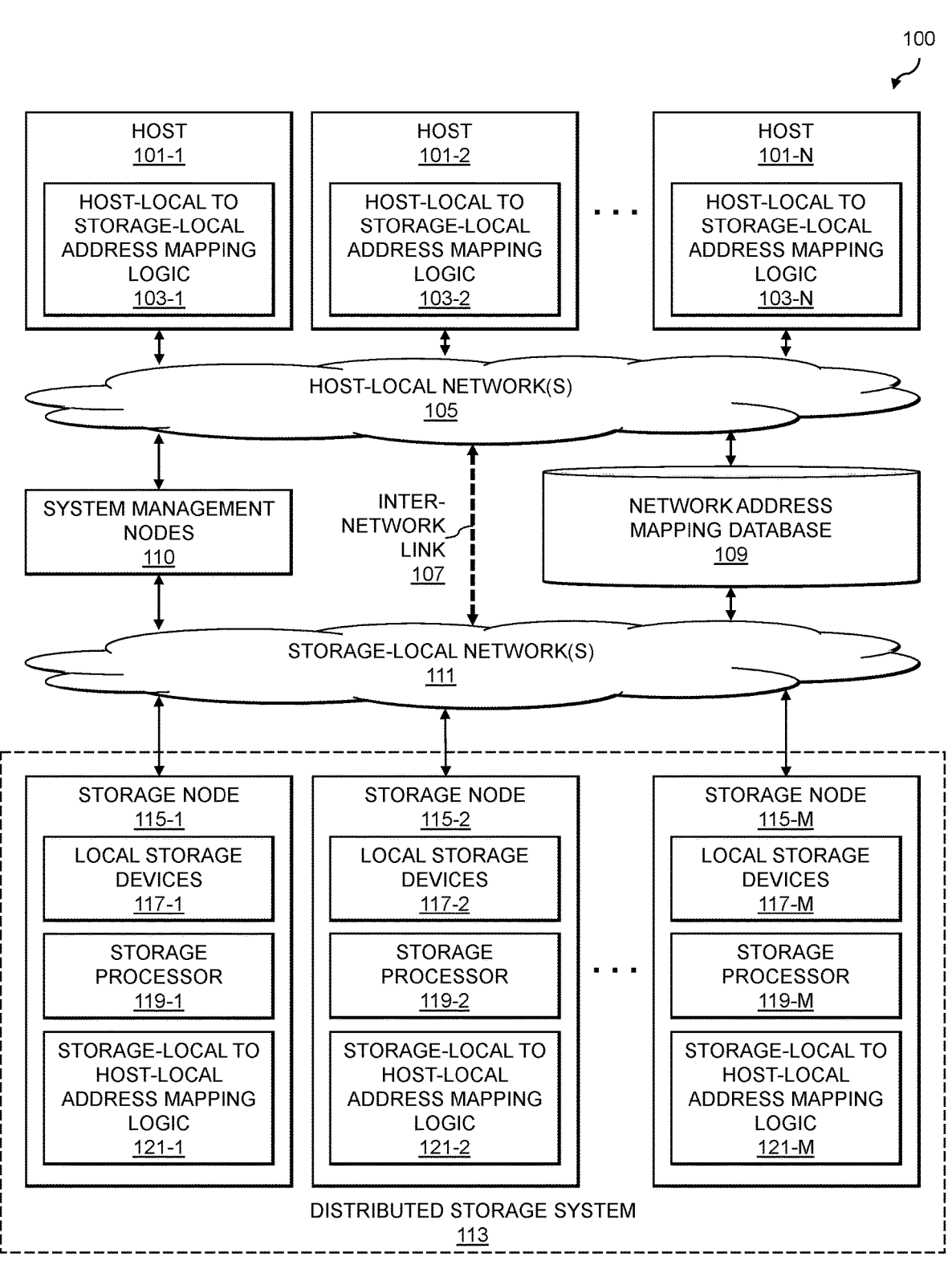
FIG. 1 is a block diagram of an information processing system configured for enabling communication between hosts and storage nodes in different networks, where network address translation is used for the communication between the different networks, in an illustrative embodiment.

FIG. 1 shows an information processing system 100 configured in accordance with an illustrative embodiment. The information processing system 100 comprises a plurality of hosts 101-1, 101-2, . . . 101-N(collectively, hosts 101), and a distributed storage system 113 shared by the hosts 101. The hosts 101 and the distributed storage system 113 in this embodiment are configured to communicate with one another via an inter-network link 107 which interconnects one or more host-local networks 105 associated with the hosts 101 and one or more storage-local networks 111 associated with storage nodes 115-1, 115-2, . . . 115-M (collectively, storage nodes 115) of the distributed storage system 113. The values N and M in this embodiment denote arbitrary integer values that in the figure are illustrated as being greater than or equal to three, although other values such as N=1, N=2, M=1 or M=2 can be used in other embodiments.

The inter-network link 107, which may also be referred to as an inter-network interconnect or inter-network connectivity, provides communication paths between the host-local networks 105 and the storage-local networks 111. It should be noted that the term "link" as used herein, unless specifically noted otherwise, is not intended to refer to a data link layer or layer 2 of the seven-layer Open Systems Interconnection (OSI) model of computer networking. The term "link" as used herein is intended to be broadly construed, and the inter-network link 107 may include multiple physical links with intermediate network nodes, routers and/or switches, multiple network paths for redundant connectivity (e.g., to avoid a single a point of failure), one or more network tunnels, one or more virtual links, combinations thereof, etc. The inter-network link 107 may include functionality for providing network address translation (NAT) between network addresses and/or ports (e.g., Internet Protocol (IP) addresses and/or Transport Control Protocol (TCP) ports and/or User Datagram Protocol (UDP) ports) in the host-local networks 105 and the storage-local networks 111. In some embodiments, the host-local networks 105 and/or the storage-local networks 111 utilize protocols such as TCP and IP, and may therefore be referred to herein as TCP/IP networks, although it is to be appreciated that the host-local networks 105 and/or the storage-local networks 111 may operate using additional or alternative protocols. In some embodiments, the host-local networks 105 and/or the storage-local networks 111 may comprise a storage area network (SAN) that includes one or more Ethernet switches or other types of switch fabrics.

It should be noted that the term "host" as used herein is intended to be broadly construed, so as to encompass, for example, a host device or a host system, each of which may comprise multiple distinct devices of various types. A host in some embodiments can comprise, for example, at least one server, as well as additional or alternative types and arrangements of processing devices.

The storage nodes 115-1 through 115-M collectively form the distributed storage system 113, which is just one possible example of what is generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the distributed storage system 113 provides one or more logical address spaces that are divided among the storage nodes 115, such that different ones of the storage nodes 115 store the data for respective different portions of the logical address space. Accordingly, in these and other similar distributed storage system arrangements, different ones of the storage nodes 115 store different portions of the logical address space. For a given logical storage volume, logical blocks of that logical storage volume are illustratively distributed across the storage nodes 115.

Other types of distributed storage systems can be used in other embodiments. For example, distributed storage system

113 can comprise multiple distinct storage arrays, such as a primary storage array and a secondary storage array, possibly deployed at different locations. Accordingly, in some embodiments, one or more of the storage nodes 115 may each be viewed as comprising at least a portion of a separate storage array with its own logical identifier (e.g., address) space. Alternatively, the storage nodes 115 can be viewed as collectively comprising one or more storage arrays. The term "storage node" as used herein is therefore intended to be broadly construed.

In some embodiments, the distributed storage system 113 comprises a software-defined storage system and the storage nodes 115 comprise respective software-defined storage server nodes of the software-defined storage system. Accordingly, the number and types of storage nodes 115 can be dynamically expanded or contracted under software control in some embodiments.

It is to be appreciated, however, that techniques disclosed herein can be implemented in other embodiments in stand-alone storage arrays or other types of storage systems that are not distributed across multiple storage nodes. The disclosed techniques are therefore applicable to a wide variety of different types of storage systems. The distributed storage system 113 is just one illustrative example.

In the distributed storage system 113, each of the storage nodes 115 is illustratively configured to interact with one or more of the hosts 101. The hosts 101 illustratively comprise servers or other types of computers of an enterprise computer system, cloud-based computer system or other arrangement of multiple compute nodes, each associated with one or more system users.

The hosts 101 in some embodiments illustratively provide compute services such as execution of one or more applications on behalf of each of one or more users associated with respective ones of the hosts 101. Such applications illustratively generate input-output (IO) operations that are processed by a corresponding one of the storage nodes 115. The term "input-output" as used herein refers to at least one of input and output. For example, IO operations may comprise write requests and/or read requests directed to logical addresses of a particular logical address space of one or more of the storage nodes 115. These and other types of IO operations are also generally referred to herein as IO requests.

The IO operations that are currently being processed in the distributed storage system 113 in some embodiments are referred to herein as outstanding IOs that have been received by the storage nodes 115 for further processing within the distributed storage system 113. The storage nodes 115 are illustratively configured to queue IO operations arriving from one or more of the hosts 101 in one or more sets of IO queues.

The storage nodes 115 illustratively comprise respective processing devices of one or more processing platforms. For example, the storage nodes 115 can each comprise one or more processing devices each having a processor and a memory, possibly implementing virtual machines and/or containers, although numerous other configurations are possible.

The storage nodes 115 can additionally or alternatively be part of cloud infrastructure, such as a cloud-based system implementing Storage-as-a-Service (StaaS) functionality.

The storage nodes 115 may be implemented on a common processing platform, or on separate processing platforms. In the case of separate processing platforms, there may be a single storage node per processing platform or multiple storage nodes per processing platform.

The hosts 101 are illustratively configured to write data to and read data from the distributed storage system 113 comprising storage nodes 115 in accordance with applications executing on those hosts 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise. Combinations of cloud and edge infrastructure can also be used in implementing a given information processing system to provide services to users.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than host-local networks 105 and storage-local networks 111 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) network interface cards and/or other types of interfaces of those devices, including, again by way of example, LAN On Motherboard (LOM) network interface cards (NICs) or other types of NICs. Such devices, together with associated host software such as, for example, IO drivers, networking stacks and/or other components, illustratively support networking protocols such as InfiniBand or Fibre Channel, in addition to TCP/IP. Numerous alternative networking arrangements are possible in a given embodiment, as will be appreciated by those skilled in the art. Additional examples include remote direct memory access (RDMA) over Converged Ethernet (RoCE), illustratively RoCEv2, or RDMA over iWARP.

The first storage node 115-1 comprises a plurality of storage devices 117-1 and an associated storage processor 119-1. The storage devices 117-1 illustratively store metadata and user data associated with one or more logical address spaces of the distributed storage system 113. The storage volumes illustratively comprise respective logical units (LUNs) or other types of logical storage volumes (e.g., NVMe namespaces). The storage devices 117-1 more particularly comprise local persistent storage devices of the first storage node 115-1. Such persistent storage devices are local to the first storage node 115-1, but remote from the second storage node 115-2, the storage node 115-M and any other ones of other storage nodes 115.

Each of the other storage nodes 115-2 through 115-M is assumed to be configured in a manner similar to that described above for the first storage node 115-1. Accordingly, by way of example, storage node 115-2 comprises a plurality of storage devices 117-2 and an associated storage processor 119-2, and storage node 115-M comprises a plurality of storage devices 117-M and an associated storage processor 119-M.

As indicated previously, the storage devices 117-2 through 117-M illustratively store metadata and user data associated with one or more storage volumes of the distributed storage system 113, such as the above-noted LUNs, NVMe namespaces or other types of logical storage volumes. The storage devices 117-2 more particularly comprise local persistent storage devices of the storage node 115-2. Such persistent storage devices are local to the storage node 115-2, but remote from the first storage node 115-1, the storage node 115-M, and any other ones of the storage nodes 115. Similarly, the storage devices 117-M more particularly comprise local persistent storage devices of the storage node 115-M. Such persistent storage devices are local to the storage node 115-M, but remote from the first storage node 115-1, the second storage node 115-2, and any other ones of the storage nodes 115.

The local persistent storage of a given one of the storage nodes 115 illustratively comprises the particular local persistent storage devices that are implemented in or otherwise associated with that storage node.

The storage processors 119 of the storage nodes 115 may include additional modules and other components typically found in conventional implementations of storage processors and storage systems, although such additional modules and other components are omitted from the figure for clarity and simplicity of illustration.

Additionally or alternatively, the storage processors 119 in some embodiments can comprise or be otherwise associated with one or more write caches and one or more write cache journals, both also illustratively distributed across the storage nodes 115 of the distributed storage system. It is further assumed in illustrative embodiments that one or more additional journals are provided in the distributed storage system, such as, for example, a metadata update journal and possibly other journals providing other types of journaling functionality for IO operations.

Illustrative embodiments disclosed herein are assumed to be configured to perform various destaging processes for write caches and associated journals, and to perform additional or alternative functions in conjunction with processing of IO operations.

The storage devices 117 of the storage nodes 115 illustratively comprise solid state drives (SSDs). Such SSDs are implemented using non-volatile memory (NVM) devices such as flash memory. Other types of NVM devices that can be used to implement at least a portion of the storage devices 117 include non-volatile random access memory (NVRAM), phase-change RAM (PC-RAM), magnetic RAM (MRAM), resistive RAM, and spin torque transfer magneto-resistive RAM (STT-MRAM), among numerous other NVM device types known to those skilled in the art. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices of the storage nodes 115 of the distributed storage system 113 of FIG. 1.

In some embodiments, the storage nodes 115 collectively provide the distributed storage system 113, although the storage nodes 115 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 115 in some embodiments comprise respective software-defined storage server nodes of a software-defined storage system, in which the number and types of storage nodes 115 can be dynamically expanded or contracted under software control using software-defined storage techniques.

The term "storage system" as used herein is therefore intended to be broadly construed, and should not be viewed as being limited to certain types of storage systems. A given storage system as the term is broadly used herein can comprise, for example, storage area networks (SANs), direct-attached storage (DAS) and distributed DAS, as well as combinations of these and other storage types, including software-defined storage.

In some embodiments, communications between the hosts 101 and the storage nodes 115 comprise NVMe commands of an NVMe storage access protocol, for example, as described in the NVM Express Base Specification, Revision 2.0c, October 2022, and its associated NVM Express Command Set Specification and NVM Express TCP Transport Specification, all of which are incorporated by reference herein. Other embodiments can utilize other types of storage access protocols. As another example, communications between the hosts 101 and the storage nodes 115 in some embodiments can comprise Small Computer System Interface (SCSI) commands and the Internet SCSI (iSCSI) protocol. As a further example, communications between the hosts 101 and the storage nodes 115 may utilize a Remote Direct Memory Access (RDMA) Transport protocol, such as RoCEv2.

Other types of commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other types, formats and configurations of IO operations can be used in other embodiments, as that term is broadly used herein.

Some embodiments disclosed herein are configured to utilize one or more RAID arrangements to store data across the storage devices 117 in each of one or more of the storage nodes 115 of the distributed storage system 113. Other embodiments can utilize other data protection techniques, such as, for example, Erasure Coding (EC), instead of one or more RAID arrangements.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage processors 119 of the respective storage nodes 115. The storage devices 117 in the context of RAID arrangements herein are also referred to as "disks" or "drives." A given such RAID arrangement may also be referred to in some embodiments herein as a "RAID array."

The RAID arrangement used in an illustrative embodiment includes a plurality of devices, each illustratively a different physical storage device of the storage devices 117. Multiple such physical storage devices are typically utilized to store data of a given NVMe namespace, LUN, or other logical storage volume in the distributed storage system. For example, data pages or other data blocks of a given NVMe namespace, LUN or other logical storage volume can be "striped" along with its corresponding parity information across multiple ones of the devices in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the devices to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the devices to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 117 of the storage nodes 115 without using RAID arrangements.

In some embodiments, the storage nodes 115 of the distributed storage system of FIG. 1 are illustratively interconnected with one another in a full mesh network, or other topology providing full any-to-any network connectivity, and are collectively managed by a system manager. A given set of local persistent storage devices on a given one of the storage nodes 115 is illustratively implemented in a disk array enclosure (DAE) or other type of storage array enclosure of that storage node. Each of the storage nodes 115 illustratively comprises a CPU or other type of processor, a memory, one or more network interface cards (NICs) or other types of network interfaces, and its corresponding storage devices 117, possibly arranged as part of a DAE of the storage node.

In some embodiments, different ones of the storage nodes 115 are associated with the same DAE or other type of storage array enclosure. The system manager is illustratively implemented as a management module or other similar management logic instance, possibly running on one or more of the storage nodes 115, on another storage node and/or on one or more separate non-storage nodes of the distributed storage system.

As a more particular non-limiting illustration, the storage nodes 115 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The system 100 as shown further comprises one or more system management nodes 110 that are illustratively configured to provide system management functionality of the type noted above. Such functionality in the present embodiment illustratively further involves utilization of control plane servers and a system management database. The system management database may include a network address mapping database 109. In some embodiments, at least portions of the system management nodes 110 and their associated control plane servers are distributed over the storage nodes 115. For example, a designated subset of the storage nodes 115 can each be configured to include a corresponding one of the control plane servers, which may be implemented via software such as using one or more virtual machines (VMs), containers, applications, etc. Other system management functionality provided by system management nodes 110 can be similarly distributed over a subset of the storage nodes 115.

The system management database stores configuration and operation information of the system 100 and portions thereof are illustratively accessible to various system administrators such as host administrators and storage administrators. As shown in FIG. 1, the system management database may include the network address mapping database 109 storing mappings between network addresses (e.g., IP addresses and/or TCP ports) in the storage-local networks 111 and the host-local networks 105. Such mappings may be generated by respective instances of host-local to storage-local address mapping logic 103-1, 103-2, . . . 103-N (collectively, host-local to storage-local address mapping logic 103) implemented on the hosts 101-1, 101-2, . . . 101-N and storage-local to host-local address mapping logic 121-1, 121-2, . . . 121-M (collectively, storage-local to host-local address mapping logic 121) implemented on the storage nodes 115-1, 115-2, . . . 115-M. Functionality of the host-local to storage-local address mapping logic 103 and the storage-local to host-local address mapping logic 121 will be described in further detail below. It should be appreciated that, in some embodiments, network address mapping functionality is provided only at one or more of the storage nodes 115 utilizing one or more of the instances of the storage-local to host-local address mapping logic 121, or only at one or more of the hosts 101 utilizing one or more of the instances of the host-local to storage-local address mapping logic 103.

The hosts 101 may include respective multi-path IO (MPIO) drivers (not shown), each of which is assumed to comprise a redirector as well as other path selection logic. In some embodiments, each of the storage nodes 115 of the distributed storage system 113 is assumed to comprise multiple controllers associated with a corresponding target of that storage node. Such a "target" as that term is broadly used herein is illustratively a destination end of one or more paths from one or more of the hosts 101 to the storage node, and may comprise, for example, one or more fabric ports of the storage node, although other types of targets can be used in other embodiments. It should be noted that different types of targets may be present in NVMe embodiments than are present in other embodiments that use other storage access protocols, such as SCSI or iSCSI embodiments. In some embodiments, a vendor-specific storage access protocol is utilized, such as a Dell PowerFlex® utilizing a vendor-specific storage access protocol involving communications between on or more Storage Data Clients (SDCs) and Storage Data Servers (SDSs).

Accordingly, the types of targets that may be implemented in a given embodiment can vary depending upon the particular storage access protocol being utilized in that embodiment, and/or other factors. Similarly, the types of initiators can vary depending upon the particular storage access protocol, and/or other factors. Again, terms such as "initiator" and "target" as used herein are intended to be broadly construed, and should not be viewed as being limited in any way to particular types of components associated with any particular storage access protocol.

The paths that are selected by instances of path selection logic in the MPIO drivers of the respective hosts 101 for delivering IO operations from the hosts 101 to the distributed storage system 113 are associated with respective initiator-target pairs, as described in more detail elsewhere herein.

In some embodiments, IO operations are processed in the hosts 101 utilizing their respective MPIO drivers in the following manner. A given one of the hosts 101 establishes a plurality of paths between at least one initiator of the given host and a plurality of targets of respective storage nodes 115 of the distributed storage system 113. For each of a plurality of IO operations generated in the given host for delivery to the distributed storage system 113, the host selects a path to a particular target, and sends the IO operation to the corresponding storage node over the selected path.

The given host above is an example of what is more generally referred to herein as "at least one processing device" that includes a processor coupled to a memory. The storage nodes 115 of the distributed storage system 113 are also examples of "at least one processing device" as that term is broadly used herein.

It is to be appreciated that path selection as disclosed herein can be performed independently by each of the hosts 101, illustratively utilizing their respective MPIO drivers and their corresponding redirectors and other path selection logic, as indicated above, with possible involvement of additional or alternative system components.

In some embodiments, the initiator of the given host and the targets of the respective storage nodes 115 are configured to support one or more designated standard storage access protocols, such as an NVMe access protocol, an SCSI access protocol, or an iSCSI access protocol. As more particular examples in the NVMe context, the designated storage access protocol may comprise an NVMe/TCP or an NVMe/RDMA access protocol, although a wide variety of additional or alternative storage access protocols can be used in other embodiments.

The hosts 101 can comprise additional or alternative components. For example, in some embodiments, the hosts 101 further comprise respective sets of IO queues associated with respective ones of the MPIO drivers. The MPIO drivers collectively comprise a multi-path layer of the hosts 101. Path selection functionality for delivery of IO operations from the hosts 101 to the distributed storage system 113 is provided in the multi-path layer by respective instances of redirectors and other path selection logic implemented within the corresponding MPIO drivers.

The MPIO drivers may comprise, for example, otherwise conventional MPIO drivers, such as PowerPath® drivers from Dell Technologies, suitably modified in the manner disclosed herein to include respective redirectors and to provide one or more portions of the disclosed functionality for proxy volume redirection. Other types of MPIO drivers from other driver vendors may be suitably modified to incorporate one or more portions of the functionality disclosed herein.

In some embodiments, the hosts 101 comprise respective local caches, implemented using respective memories of those hosts. As an example, a given such local cache can be implemented using host main memory (e.g., dynamic random-access memory (DRAM)) and/or using one or more cache cards. A wide variety of different caching techniques can be used in other embodiments, as will be appreciated by those skilled in the art. Other examples of memories of the respective hosts 101 that may be utilized to provide local caches include one or more memory cards or other memory devices, such as, for example, DRAM, an NVMe over PCIe cache card, a local flash drive or other type of NVM storage drive, or combinations of these and other host memory devices.

The MPIO drivers are illustratively configured to deliver IO operations selected from their respective sets of IO queues to the distributed storage system 113 via selected ones of multiple paths over the host-local networks 105, the inter-network link 107, and the storage-local networks 111. The sources of the IO operations stored in the sets of IO queues illustratively include respective processes of one or more applications executing on the hosts 101. For example, IO operations can be generated by each of multiple processes of a database application running on one or more of the hosts 101. Such processes issue IO operations for delivery to the distributed storage system 113 over the host-local networks 105, the inter-network link 107, and the storage-local networks 111. Other types of sources of IO operations may be present in a given implementation of system 100.

A given IO operation is therefore illustratively generated by a process of an application running on a given one of the hosts 101, and is queued in one of the IO queues of the given host with other operations generated by other processes of that application, and possibly other processes of other applications.

The paths from the given host to the distributed storage system 113 illustratively comprise paths associated with respective initiator-target pairs, with each initiator comprising, for example, a port of a single-port or multi-port NIC or other initiating entity of the given host and each target comprising a port or other targeted entity corresponding to one or more of the storage devices 117 of the distributed storage system 113. As noted above, the storage devices 117 illustratively comprise LUNs, NVMe namespaces or other types of logical storage devices.

In some embodiments, at least a portion of the initiators comprise virtual initiators in which multiple network addresses can be supported by a single network interface, such as, for example, multiple media access control (MAC) addresses on a single network interface of an Ethernet NIC. Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

Accordingly, in some embodiments, multiple virtual initiators are associated with a single NIC of a given one of the hosts 101 but have respective unique identifiers associated therewith.

Additionally or alternatively, different ones of the multiple virtual initiators are illustratively associated with respective different ones of a plurality of virtual machines of the given host that share a single NIC of the given host, or a plurality of logical partitions of the given host that share a single NIC of the given host.

Numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Various scheduling algorithms, load balancing algorithms and/or other types of algorithms can be utilized by the MPIO driver of the given host in delivering IO operations from the IO queues of that host to the distributed storage system 113 over particular paths via the host-local networks 105, the inter-network link 107 and the storage-local networks 111. Each such IO operation is assumed to comprise one or more commands for instructing the distributed storage system 113 to perform particular types of storage-related functions such as reading data from or writing data to particular logical volumes of the distributed storage system 113. For example, in the case of write requests, such commands are assumed to have various payload sizes associated therewith, and the payload associated with a given command may be referred to as its "command payload." Other arrangements are used for read requests, with the payload moving in the opposite direction.

A command directed by the given host to the distributed storage system 113 is considered an "outstanding" command until such time as its execution is completed in the viewpoint of the given host, at which time it is considered a "completed" command. The commands illustratively comprise respective NVMe commands, although other command formats, such as SCSI command formats, can be used in other embodiments. In the SCSI context, a given such command is illustratively defined by a corresponding command descriptor block (CDB) or similar format construct. The given command can have multiple blocks of payload associated therewith, such as a particular number of 512-byte logical blocks or other sizes and/or structures of logical blocks. Other command formats, e.g., Submission Queue Entry (SQE), are utilized in the NVMe context.

In illustrative embodiments to be described below, it is assumed without limitation that the initiators of a plurality of initiator-target pairs comprise or are otherwise associated with respective ports of the given host and that the targets of the plurality of initiator-target pairs comprise or are otherwise associated respective ports of the distributed storage system 113, although numerous other initiator-target arrangements are possible, and such terms are therefore intended to be broadly construed herein, and should not be viewed as limited to particular interface types, such as SCSI or NVMe interfaces. The host ports can comprise, for example, ports of single-port HBAs and/or ports of multiport HBAs, or other types of host ports, including NICs. Again, a wide variety of other types and arrangements of initiators and targets can be used in other embodiments.

Selecting a particular one of multiple available paths for delivery of a selected one of the IO operations from the given host is more generally referred to herein as "path selection." Path selection as that term is broadly used herein can in some cases involve both selection of a particular IO operation and selection of one of multiple possible paths for accessing a corresponding logical device of the distributed storage system 113. The corresponding logical device illustratively comprises a LUN or other logical storage volume (e.g., an NVMe namespace) to which the particular IO operation is directed.

It should be noted that paths may be added or deleted between the hosts 101 and the distributed storage system 113 in the system 100. For example, the addition of one or more new paths from the given host to the distributed storage system 113 or the deletion of one or more existing paths from the given host to the distributed storage system 113 may result from respective addition or deletion of at least a portion of the storage devices 117 of the distributed storage system 113.

Addition or deletion of paths can also occur as a result of zoning and masking changes or other types of storage system reconfigurations performed by a storage administrator or other user. Some embodiments are configured to send a predetermined command from the given host to the distributed storage system 113, illustratively utilizing the MPIO driver, to determine if masking information has been changed. Zoning changes may be handled by the fabric and/or network switches. The predetermined command can comprise, for example, in the SCSI context, a log sense command, a mode sense command, a "vendor unique command" or VU command, or combinations of multiple instances of these or other commands, in an otherwise standardized command format. Analogous NVMe commands include Get Log Page and Get Features commands.

In some embodiments, paths are added or deleted in conjunction with, for example, load rebalancing among storage nodes, or under other conditions such as addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs, NVMe namespaces or other logical storage volumes associated with the one or more new paths identified in the path discovery scan. The path discovery scan may comprise, for example, one or more scans that are configured to discover the appearance of any new LUNs or NVMe namespaces that have been added to the distributed storage system 113 as well to discover the disappearance of any existing LUNs or NVMe namespaces that have been deleted from the distributed storage system 113.

The MPIO driver of the given host in some embodiments comprises a user-space portion and a kernel-space portion. The kernel-space portion of the MPIO driver may be configured to detect one or more path changes of the type mentioned above, and to instruct the user-space portion of the MPIO driver to run a path discovery scan responsive to the detected path changes. Other divisions of functionality between the user-space portion and the kernel-space portion of the MPIO driver are possible. The user-space portion of the MPIO driver is illustratively associated with an operating system kernel of the given host.

For each of one or more new paths identified in the path discovery scan, the given host may be configured to execute a host registration operation for that path. The host registration operation for a given new path illustratively provides notification to the distributed storage system 102 that the given host has discovered the new path.

As indicated previously, the storage nodes 115 of the distributed storage system 113 process IO operations from one or more hosts 101 and in processing those IO operations run various storage application processes that generally involve interaction of that storage node with one or more other ones of the storage nodes.

In the FIG. 1 embodiment, the distributed storage system 113 comprises storage processors 119 and corresponding sets of storage devices 117, and may include additional or alternative components, such as sets of local caches.

The storage processors 119 illustratively control the processing of IO operations received in the distributed storage system 113 from the hosts 101. For example, the storage processors 119 illustratively manage the processing of read and write commands directed by the MPIO drivers of the hosts 101 to particular ones of the storage nodes 115. This processing illustratively includes, for example, a given one of the storage processors 119 on a given one of the storage nodes 115 directing read requests and/or write requests received from one or more of the hosts 101 to local storage devices on the given storage node and/or local storage devices on one or more other ones of the storage nodes 115.

The storage processors 119 can be implemented as respective storage controllers, directors or other storage system components configured to control storage system operations relating to processing of IO operations. In some embodiments, each of the storage processors 119 has a different one of the above-noted local caches associated therewith, although numerous alternative arrangements are possible.

The host-local to storage-local address mapping logic 103 and storage-local to host-local address mapping logic 121 are configured to provide functionality which enables communication between the hosts 101 in the host-local networks 105 and the storage nodes 115 in the storage-local networks 111, where NAT is used for communication over the inter-network link 107 between the host-local networks 105 and the storage-local network 111. The host-local to storage-local address mapping logic 103 and storage-local to host-local address mapping logic 121, for example, cope with incomplete translation performed by NAT functionality of the inter-network link 107 (e.g., where the NAT functionality of the inter-network link 107 translates message and/or packet headers only, and not network addresses such as IP addresses and TCP ports in message and/or packet bodies). In some embodiments, the storage-local to host-local address mapping functionality includes determining a mapping data structure as part of a network discovery process, where the mapping data structure includes mappings between network addresses in the host-local networks 105 and network addresses in the storage-local networks 111.

An additional example of an illustrative process for implementing at least some of the above-described network address mapping functionality enabling communications between hosts and storage nodes in different networks will be provided below in conjunction with the flow diagram of FIG. 2.

As indicated previously, the storage nodes 115 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

Also, the term "storage volume" as used herein is intended to be broadly construed, and should not be viewed as being limited to any particular format or configuration.

In some embodiments, the storage nodes 115 are implemented using processing modules that are interconnected, for example, in a full mesh network or other topology providing full any-to-any network connectivity, such that a process of one of the processing modules can communicate with processes of any of the other processing modules. Commands issued by the processes can include, for example, remote procedure calls (RPCs) and/or application programming interface (API) invocations directed to other ones of the processes.

The sets of processing modules of the storage nodes 115 illustratively comprise control modules, data modules, routing modules and at least one management module. Again, these and possibly other processing modules of the storage nodes 115 are illustratively interconnected with one another in a full mesh network or other topology providing full any-to-any network connectivity, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 115.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication may be established between the various processing modules of the storage nodes using well-known communication protocols such as TCP/IP and RoCEv2. For example, respective sets of IP routes used in data transfer and corresponding messaging could be associated with respective different ones of the routing modules.

The particular features described above in conjunction with FIG. 1 should not be construed as limiting in any way, and a wide variety of other system arrangements implementing network address mapping functionality enabling communications between hosts and storage nodes in different networks as disclosed herein are possible.

The storage nodes 115 of the example distributed storage system 113 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 115 may be implemented on respective distinct processing platforms, although numerous other arrangements are possible. At least portions of their associated hosts 101 may be implemented on the same processing platforms as the storage nodes 115 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the hosts 101 and the storage nodes 115 to reside in different data centers. Numerous other distributed implementations of the storage nodes 115 and their respective associated sets of hosts 101 are possible.

Additional examples of processing platforms utilized to implement storage systems and possibly their associated hosts in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as hosts 101, distributed storage system 113, storage nodes 115, storage devices 117, storage processors 119, and system management nodes 110 can be used in other embodiments. For example, as mentioned previously, system management functionality of system management nodes 110 can be distributed across a subset of the storage nodes 115, instead of being implemented on separate nodes.

It should be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

For example, in other embodiments, certain portions of the network address mapping functionality which enables communication between hosts and storage nodes in different networks as disclosed herein can be implemented in one or more hosts, in a storage system, or partially in a host and partially in a storage system. Accordingly, illustrative embodiments are not limited to arrangements in which the network address mapping functionality which enables communication between hosts and storage nodes in different networks is implemented primarily in storage system or primarily in a particular host or set of hosts, and therefore such embodiments encompass various alternative arrangements, such as, for example, an arrangement in which the functionality is distributed over one or more storage systems and one or more associated hosts, each comprising one or more processing devices. The term "at least one processing device" as used herein is therefore intended to be broadly construed.

The operation of the information processing system 100 will now be described in further detail with reference to the flow diagram of the illustrative embodiment of FIG. 2, which illustrates a process for performing network address mapping for communications between hosts and storage nodes in different networks as disclosed herein. This process may be viewed as an example algorithm implemented at least in part by one or more of the hosts 101 interacting with one or more of the storage nodes 115 of the distributed storage system 113. These and other algorithms for network address mapping for communication between hosts and storage nodes in different networks as disclosed herein can be implemented using other types and arrangements of system components in other embodiments.

The process illustrated in FIG. 2 includes steps 200 through 208, and is assumed to be implemented by one or more of the hosts 101 utilizing the host-local to storage-local address mapping logic 103 and/or one or more of the storage nodes 115 utilizing the storage-local to host-local address mapping logic 121.

In step 200, as part of a network discovery process for at least one host device operating in a first network which accesses at least one storage node of a storage system operating in a second network, a network address mapping data structure is determined. The network address mapping data structure comprises one or more mappings between a first set of one or more network addresses in the first network and a second set of one or more network addresses in a second network. It should be noted that the network address mapping data structure may be generated or created outside of the network discovery process (e.g., in an automated configuration process, at least partially by a human administrator, etc.). Thus, the network address mapping data structure may already be configured or in place at the time of a first discovery attempt, or it may not be configured or in place at the time of the first discovery attempt. If the network address mapping data structure is not yet in place, it may be generated on-demand (e.g., by triggering or alerting an automated configuration process or human administrator to establish the required network address mapping data structure). Thus, "determining" the network address mapping data structure is intended to be broadly construed to cover these and other situations where an already in place network address mapping data structure is obtained, where generation or creation of the network address mapping data structure is triggered or performed in response to or as part of the discovery process, etc. In some embodiments, the network discovery process is performed "in-band" through a connection between ports which can later be used for IO connections between the at least one host device and the at least one storage node (e.g., such as in NVMe and iSCSI protocol implementations). In other embodiments, the network discovery process may be performed "out-of-band" or via a connection between ports which is not later used for IO connections between the at least one host device and the at least one storage node (e.g., such as in certain vendor-specific protocol implementations where, for example, an SDC has a control connection with a Metadata Manager (MDM) from which connection information is received). Thus, the network discovery process may be an in-band discovery process or may be performed over an out-of-band control path.

The storage system may comprise a distributed storage system comprising a plurality of storage nodes including the at least one storage node. The first network may comprise a first network subnet associated with a first virtual private cloud on which the at least one host device is deployed, and the second network may comprise a second network subnet associated with a second virtual private cloud on which the at least one storage node of the storage system is deployed.

In some embodiments, the first and second sets of one or more network addresses comprise IP addresses, and the one or more mappings in the network address mapping data structure map between a first set of one or more IP addresses in the first network and a second set of one or more IP addresses in the second network while maintaining TCP ports of the first and second sets of one or more network addresses. In other embodiments, the first and second sets of one or more network addresses comprise IP addresses and TCP ports, and the one or more mappings in the network address mapping data structure map between both IP addresses and TCP ports in the first set of one or more network addresses and IP addresses and TCP ports in the second set of one or more network addresses.

In step 202, at least one of the one or more mappings in the network address mapping data structure is associated with an identifier of the at least one host device operating in the first network. This association may include returning one or more of the mappings in the network address mapping data structure to the at least one host device in response to a discovery request.

In step 204, one or more communications to be exchanged between the at least one host device operating in the first network and the at least one storage node operating in the second network are obtained.

In step 206, the one or more communications are modified based at least in part on at least one of the one or more mappings in the network address mapping data structure which is associated with the identifier of the at least one host device operating in the first network.

In step 208, the modified one or more communications are provided to an inter-network link between the first network and the second network. In some embodiments, the one or more communications comprise at least one IP packet having a header and a payload, where the inter-network link is configured to perform IP NAT for source and destination network addresses in the header of the IP packet, and where modifying the one or more communications based at least in part on at least one of the one or more mappings in the network address mapping data structure comprises modifying one or more network addresses in the payload of the IP packet.

Communication over the inter-network link between the first network and the second network may utilize the NVMe/TCP protocol and the network discovery process may comprise an NVM discovery process in the second network to determine one or more NVM ports that are available at one or more network addresses (e.g., certain IP addresses and/or TCP ports), where each of the NVM ports makes one or more NVM namespaces available to the at least one host device. The NAT data structure may comprise an association of a host NVMe qualified name (NQN) of the at least one host device with a mapping table comprising at least a subset of the one or more mappings between the first and second sets of one or more network addresses. The second set of network addresses may comprise NVMe/TCP Transport Addresses and NVMe/TCP Transport Service Identifiers.

Communication over the inter-network link between the first network and the second network may alternatively utilize an iSCSI protocol, and the network discovery process may comprise an iSCSI discovery process in the second network. The network address mapping data structure may comprise an association of a host iSCSI qualified name (IQN) of the at least one host deice with a mapping table comprising at least a subset of the one or more mapping between the first and second sets of one or more network addresses. The second set of network addresses may comprise the values of one or more iSCSI TargetAddress text keys.

The one or more mappings of the network address mapping data structure may comprise mappings of respective ones of the first set of one or more network addresses to respective ones of the second set of one or more network addresses, the one or more communications may comprise a given communication originating at the at least one host device which is destined for the at least one storage node of the storage system, and modifying the given communication may utilize the one or more mappings of the network address mapping data structure. The one or more communications may also or alternatively comprise a given communication originating at the at least one storage node of the storage system which is destined for the at least one host device, and modifying the given communication may be based at least in part on observing source address information from one or more previous communications originating at the at least one host device which are destined for the at least one storage node of the storage system.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are therefore presented by way of illustrative example only, and should not be construed as limiting the scope of the disclosure in any way. Alternative embodiments can use other types of processing operations for implementing network address mapping functionality for communications between hosts and storage nodes in different networks. For example, as indicated above, the ordering of the process steps may be varied in other embodiments, or certain steps may be performed at least in part concurrently with one another rather than serially. Also as indicated previously, one or more of the process steps may be repeated periodically, or multiple instances of the process can be performed in parallel with one another in order to implement a plurality of different processes for performing network address mapping for other host devices and/or storage nodes.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

One or more hosts and/or one or more storage nodes can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Hosts, storage processors and other system components may be implemented at least in part using processing devices of such processing platforms. For example, respective logic instances of the hosts and/or storage nodes can be implemented in respective virtual machines running on respective ones of the processing devices of a processing platform.

In some embodiments, distributed storage systems are deployed in cloud computing platforms. For example, a Dell PowerFlex® storage system may be deployed in an Amazon AWS cloud. In such cloud-based deployments, network configuration for host-to-storage access poses various technical challenges, which are not present for on-premises datacenter deployments. Cloud computing platforms may offer various network options, such as: routing host-to-storage traffic through a Transit Gateway; Virtual Private Cloud (VPC)-to-VPC peering, which introduces configuration complexity as each VPC-to-VPC relationship is configured individually and each VPC may have a limited number of peer VPCs (e.g., 125 peer VPCs) which may be insufficient for larger environments; and an inter-VPC private link providing high-speed networking and a simpler configuration than VPC-to-VPC peering. While the use of an inter-VPC private link provides some technical and cost advantages, it does introduce IP NAT into host-to-storage communications. Such host-to-storage communications may take place over or using an NVMe/TCP protocol, an iSCSI protocol, etc.

Illustrative embodiments provide technical solutions for enabling storage traffic over IP NAT between host-local and storage-local networks. It should be noted that while some embodiments are described with respect to a Dell PowerFlex® storage cloud deployment on VPCs with inter-VPC links (e.g., AWS PrivateLink high-speed network), embodiments are not limited to such deployments. The technical solutions described herein may more generally be applied to any storage system supporting the NVMe/TCP, iSCSI or other protocol for storage access, where the storage system is deployed on-premises or in the cloud, if the host-to-storage network communication involves IP NAT of any kind.

FIG. 3A shows a private cloud deployment 300 of a storage system (e.g., a Dell PowerFlex® storage system), where hosts (e.g., applications) are deployed in a host VPC 301 and the storage system is deployed in a storage VPC 305. The host VPC 301 and the storage VPC 305 are interconnected via an inter-VPC link 303. In the private cloud deployment 300 of FIG. 3A, the host VPC 301 includes host or application subnets 310-A and 310-B (collectively, app subnets 310), and the storage VPC 305 includes storage subnets 350-A and 350-B (collectively, storage subnets 350). The app subnet 310-A and the storage subnet 350-A are part of a first availability zone 315-A, and the app subnet 310-B and the storage subnet 350-B are part of a second availability zone 315-B. Although not shown for clarity of illustration, the private cloud deployment 300 may include one or more additional availability zones each having an app subnet and a storage subnet configured in a manner similar to that of the availability zones 315-A and 315-B (collectively, availability zones 315).

The app subnet 310-A includes a first set of application hosts 311-1 and 311-2, and the app subnet 310-B includes a second set of application hosts 311-3 and 311-4. The application hosts 311-1, 311-2, 311-3 and 311-4 are collectively referred to as application hosts 311. The application hosts 311-1 and 311-2 are associated with VPC endpoint 312-A, and the application hosts 311-3 and 311-4 are associated with VPC endpoint 312-B.

The storage subnet 350-A includes an endpoint service 351-A, a storage data target (SDT) 352-A, storage data servers (SDSs) 353-A-1 and 353-A-2 (collectively, SDSs 353-A), a storage manager platform (SMP) 354-A (e.g., which may be implemented as a PowerFlex Manager Platform (PFMP) component or other type of cluster controller), and an MDM 355-A. The SDT 352-A is used to expose NVMe/TCP targets. The SDT 352-A is deployed with the SDS 353-A-1, and provides access to storage volumes inside a protection domain. The SDT 352-A, for example, provides an NVMe target. NVMe initiators from the application hosts 311 access the SDSs 353-A via the SDT 352-A. The SDSs 353-A aggregate storage media (e.g., local storage) as one or more unified storage pools on which logical volumes are created, and are examples of what are more generally referred to herein as "storage nodes." The SMP 354-A provides functionality for load balancing among the storage nodes through communication with a storage load balancer 359 running on the storage VPC 305. A management node 309 may access and configure the storage load balancer 359. The MDM 355-A provides functionality for management of the storage system. The storage subnet 350-B similarly includes an endpoint service 351-B, SDT 352-B, SDSs 353-B-1 and 353-B-2 (collectively, SDSs 353-B), SMP 354-B and MDM 355-B, which are configured in a manner similar to that of the endpoint service 351-A, SDT 352-A, SDSs 353-A, SMP 354-A and MDM 355-A.

In the private cloud deployment 300 of FIG. 3A, NVMe/TCP ports hosted by SDTs 352-A and 352-B (collectively, SDTs 352) are exposed into the host VPC 301 over the inter-VPC link 303 as the VPC endpoints 312-A and 312-B (collectively, VPC endpoints 312). Here, the VPC endpoints 312 and endpoint services 351 act as a one-to-one IP NAT (e.g., where IP addresses are translated and TCP ports are not translated), which requires additional support to make the private cloud deployment 300 possible, as neither the VPC endpoints 312 nor the endpoint services 351 contain an application-level gateway for NVMe/TCP discovery. NVMe/TCP specifications do not offer any standard way to make NVM discovery work over IP NAT.

Figure 3B:
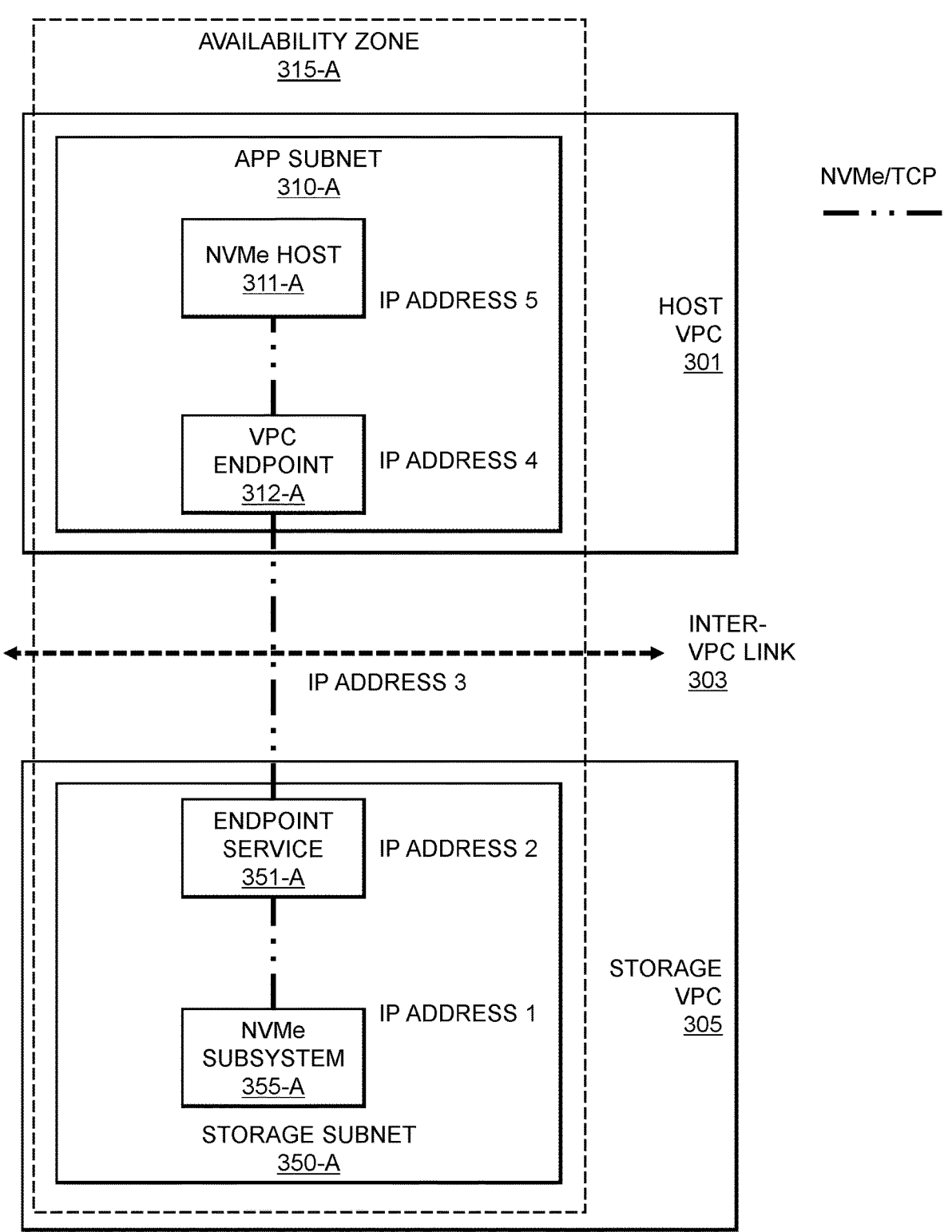
FIG. 3B shows another view of the private cloud deployment of the storage system of FIG. 3A in an illustrative embodiment.

FIG. 3B shows a more detailed view of aspects of the private cloud deployment 300. More particularly, FIG. 3B shows aspects of the availability zone 315-A where the application hosts 311-1 and 311-2 are generally represented as NVMe host 311-A, and wherein various components of the storage subnet 350-A are represented as NVMe subsystem 355-A. The NVMe subsystem 355-A is associated with IP address 1 (IP_1), the endpoint service 351-A is associated with IP address 2 (IP_2), the inter-VPC link 303 is associated with IP address 3 (IP_3), the VPC endpoint 312-A is associated with IP address 4 (IP_4), and the NVMe host 311-A is associated with IP address 5 (IP_5). The NVMe host 311-A in the host VPC 301 communicates with the NVMe subsystem 355-A via the VPC endpoint 312-A by sending IP packets to IP_4. While these IP packets can reach the NVMe subsystem 355-A and responses are received by the NVMe host 311-A, if used for NVM discovery then Discovery Log Pages that the NVMe subsystem 355-A returns contain port information in terms of IP addresses known to the NVMe subsystem 355-A in its network (e.g., IP_1). Subsequent NVMe host 311-A attempts to connect to IP_1 will fail, as IP_1 is not known in the NVMe host 311-A local network. It should be noted that while in this example the inter-VPC link 303 is assumed to only translate IP addresses and not TCP ports, in other embodiments TCP ports may also get translated.

Consider, as an example, the following scenario in FIG. 3B. The NVMe subsystem 355-A sends a packet to NVMe host 311-A. This packet is sent from source IP address IP_1 to destination IP address IP_2, with these source and destination addresses being in the packet header. The packet also contains an instance of IP address IP_1 in the packet body/payload, and the goal is to cause the host 311-A to contact the NVMe subsystem 25-A at IP address IP_1. As the packet passes through the inter-VPC link 303, NAT functionality which is part of the inter-VPC link 303 translates the source IP address (IP_1) and the destination IP address (IP_2) that are in the packet header to source IP address IP_4 and destination IP address IP_5. The NAT functionality that is part of the inter-VPC link 303 ignores the packet body/payload, and hence does not translate the instance of IP_1 which is in the packet body/payload. The host 311-A receives the packet with the translated source IP address IP_4 and the translated destination IP address IP_5, but the packet still contains an instance of IP_1 in the packet body/payload. The host 311-A will attempt to contact the NVMe subsystem 355-A using that instance of IP_1 in the packet body/payload. This attempt, however, will not work because IP_1 is not a valid (reachable) IP address in the app subnet 310-A.

The technical solutions described herein provide functionality which enables the NVMe subsystem 355-A to change the instance of IP_1 which is in the packet's body/payload to IP address IP_4, so that the packet as received by the host 311-A includes the translated source IP address IP_4 and translated destination IP address IP_5 in the packet header, as well as an instance of IP address IP_4 in the packet body/payload (e.g., rather than the instance of IP address IP_1). Now, when the host 311-A attempts to contact the NVMe subsystem 355-A using that instance of IP address IP_4 in the packet body/payload, the attempt works because IP_4 is a valid (reachable) IP address in the app subnet 310-A (e.g., it is the IP address of the VPC endpoint 312-A), and the NAT functionality that is part of the inter-VPC link 303 translates IP address IP_4 (e.g., the destination address in the packet header) to IP address IP_1, so the packet is delivered to the NVMe subsystem 355-A at IP address IP_1, achieving the desired outcome.

The technical solutions described herein, in some embodiments, provide functionality for enabling NVMe/TCP storage deployments to work over IP NAT. IP address, or IP address and TCP port (e.g., the TCP port is used as an NVMe/TCP Transport Service Identifier) mapping configurations are generated from an NVMe/TCP storage-local network to an NVMe host-local network. By way of example, in a private cloud deployment of a distributed storage system such as Dell PowerFlex©, a cloud deployment orchestrator enumerates NVM ports including IP addresses and TCP ports in the storage-local network. The cloud deployment orchestrator exposes each NVM port as a VPC endpoint (e.g., VPC endpoints 312) over an inter-VPC link (e.g., inter-VPC link 303). The cloud deployment orchestrator further discovers VPC endpoint IP addresses and builds a translation table from NVM port IP addresses and/or TCP ports in the storage-local networks (e.g., the storage subnets 350) to IP addresses and/or TCP ports in the NVMe host-local networks (e.g., the app subnets 310). It should be noted that, in the context of the FIG. 3B example, the mapping of IP_5 to IP_2 may be automatically configured based on a mapping of IP_1 to IP_4. Once completed, the translation table is configured on the distributed storage system using one or more application programming interfaces (APIs). Alternatively, IP address and/or TCP port mappings may be configured by other software packages or manually by a user.

Configured IP address, or IP address and TCP port mappings are associated with particular NVMe hosts to account for the possibility that different NVMe hosts communicate over different IP NAT devices. By way of example, in a private cloud deployment of a distributed storage system such as Dell PowerFlex®, a host NVMe Qualified Name (NQN) is discovered by the cloud deployment orchestrator or another software package. The translation table is associated with the host NQN (e.g., using one or more APIs of the distributed storage system) prior to the first discovery attempt. Within the distributed storage system, the translation table may be associated with a host object corresponding to the specified host NQN. Alternatively, when an NVMe host first connects to the distributed storage system's NVM Discovery Subsystem over a VPC endpoint, the distributed storage system may return an empty Discovery Log Page as the NVMe host is not yet configured on the distributed storage system. However, once the NVMe host has connected to the NVM Discovery Subsystem, its host NQN is known to the distributed storage system and a storage administrator can associated the host NQN with the translation table. In either case, the distributed storage system supports Discovery Log Page Change notifications that notify NVMe hosts with Asynchronous Events about Discovery Log Page updates, if the NVMe hosts support such notifications. On receiving such notifications, the NVMe hosts can get the Discovery Log Page again.

The NVM discovery returns NVM port IP addresses (e.g., NVMe/TCP Transport Addresses) and/or TCP ports (e.g., NVMe/TCP Transport Service Identifiers) based on the configured mapping for the NVMe host and not the local NVMe/TCP storage network. By way 15 of example, in a private cloud deployment of a distributed storage system such as Dell PowerFlex©, an NVM Discovery Log Page is populated with NVM port addresses translated from storage-local IP addresses and/or TCP ports into NVMe host-local IP addresses and/or TCP ports.

In some embodiments, an iSCSI protocol may be used for communications between host-local networks (e.g., a host VPC) and storage-local networks (e.g., a storage VPC). iSCSI discovery is based on TargetName and TargetAddress text key responses to a SendTargets text key sent by an iSCSI initiator during iSCSI negotiation. The TargetAddress text key may contain an IP address, either iPv4 or iPv6, and independently may also contain a TCP port. The technical solutions described herein can support IP NAT with iSCSI, by specifying that any IP address (and TCP port) returned in a TargetAddress text key be an IP address (and a TCP port at that IP address) in the host subnet (e.g., in a host-local network such as one of the host subnets), which is the IP address IP_4 in the example of FIG. 3B discussed above. The NAT functionality is responsible for translating that IP address (when used as a destination address for an IP packet) and destination TCP port to an IP address in an appropriate iSCSI subnet (e.g., in a storage-local network such as one of the storage subnets), which is one of the IP addresses IP_2 and IP_3 in the example of FIG. 3B discussed above.

Figure 4A:
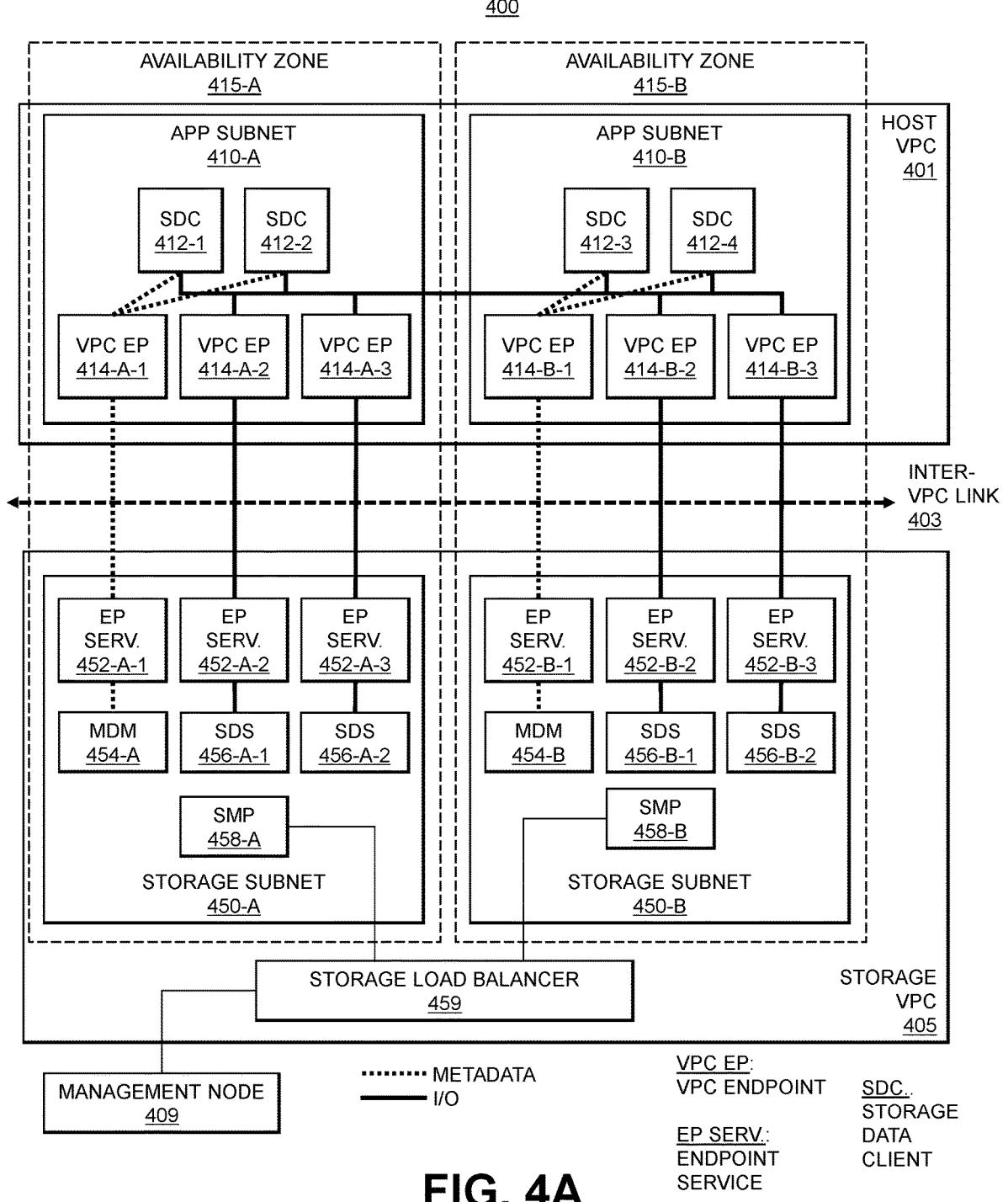
FIG. 4A shows another private cloud deployment of a storage system configured for network address translation functionality in an illustrative embodiment.

FIG. 4A shows a private cloud deployment 400 of a storage system (e.g., a Dell PowerFlex® storage system), where hosts (e.g., applications) are deployed in a host VPC 401 and the storage system is deployed in a storage VPC 405. The host VPC 401 and the storage VPC 405 are interconnected via an inter-VPC link 403. In the private cloud deployment 400 of FIG. 4A, the host VPC 401 includes host or application subnets 410-A and 410-B (collectively, app subnets 410), and the storage VPC 405 includes storage subnets 450-A and 450-B (collectively, storage subnets 450). The app subnet 410-A and the storage subnet 450-A are part of a first availability zone 415-A, and the app subnet 410-B and the storage subnet 450-B are part of a second availability zone 415-B. Although not shown for clarity of illustration, the private cloud deployment 400 may include one or more additional availability zones each having an app subnet and a storage subnet configured in a manner similar to that of the availability zones 415-A and 415-B (collectively, availability zones 415).

The app subnet 410-A includes a first set of SDCs 412-1 and 412-2, and the app subnet 410-B includes a second set of SDCs 412-3 and 412-4. The SDCs 412-1, 412-2, 412-3 and 412-4 are collectively referred to as SDCs 412. The app subnet 410-A includes three VPC endpoints 414-A-1, 414-A-2 and 414-A-3 (collectively, VPC endpoints 414-A), and the app subnet 410-B includes three VPC endpoints 414-B-1, 414-B-2 and 414-B-3 (collectively, VPC endpoints 414-B). Here, there is a one-to-one relationship between the VPC endpoints 414-A and 414-B and corresponding endpoint services and components in the storage subnets 450-A and 450-B.

The storage subnet 450-A includes endpoint service 452-A-1, 452-A-2 and 452-A-3 (collectively, endpoint services 452-A) which are associated with MDM 454-A, SDS 456-A-1 and SDS 456-A-2, respectively. The storage subnet 450-A also includes SMP 458-A which, similar to SMP 354-A, may be implemented as a PFMP component or other type of cluster controller. The SDSs 456-A-1 and 456-A-2 (collectively, SDSs 456-A) aggregate storage media (e.g., local storage) as one or more unified storage pools on which logical volumes are created, and are examples of what are more generally referred to herein as "storage nodes." The SMP 458-A provides functionality for load balancing among the storage nodes through communication with a storage load balancer 459 running on the storage VPC 405. A management node 409 may access and configure the storage load balancer 459. The MDM 454-A provides functionality for management of the storage system. The storage subnet 450-B similarly includes endpoint services 452-B-1, 452-B-2 and 452-B-3 (collectively, endpoint services 452-B) which are associated with MDM 454-B, SDS 456-B-1 and SDS 456-B-2, respectively. The storage subnet 450-B also includes an SMP 458-B. The endpoints services 452-B, MDM 454-B, SDSs 456-B-1 and 456-B-2 (collectively, SDSs 456-B) and SMP 458-B are configured in a manner similar to that of the endpoint services 452-A, MDM 454-A, SDSs 456-A and SMP 458-A.

Where the private cloud deployment 300 of FIGS. 3A and 3B utilizes NVMe/TCP communications between the host VPC 301 and the storage VPC 305 over the inter-VPC link 303, in the private cloud deployment 400 of FIG. 4A it is assumed that another protocol (e.g., a proprietary storage system communication protocol for SDC-SDS communication over IP NAT) is used for communication between the host VPC 401 and the storage VPC 405 over inter-VPC link 403. The SDCs 412 utilize the VPC endpoints 414-A-1 and 414-A-2 for metadata communication with MDMs 454-A and 454-B via the endpoint services 452-A-1 and 452-B-1. The SDCs 412 utilize the VPC endpoints 414-A-2, 414-A-3, 414-B-2 and 414-B-3 for I/O communication with SDSs 456-A and 456-B via the endpoint services 452-A-2, 452-A-3, 452-B-2 and 452-B-3.

As illustrated in FIG. 4A, IP NAT may be performed per component (e.g., without translating ports) as can be done over each connection between the host VPC 401 and the storage VPC 405 over the inter-VPC link 403 (e.g., which may be implemented as separate load balancer components, such as AWS load balancers, providing the endpoint services 452-A). It is also possible to route all communications through a single load balancer or endpoint service, translating not only IP addresses but also TCP ports. Such an implementation is illustrated in FIG. 4B.

Figure 4B:
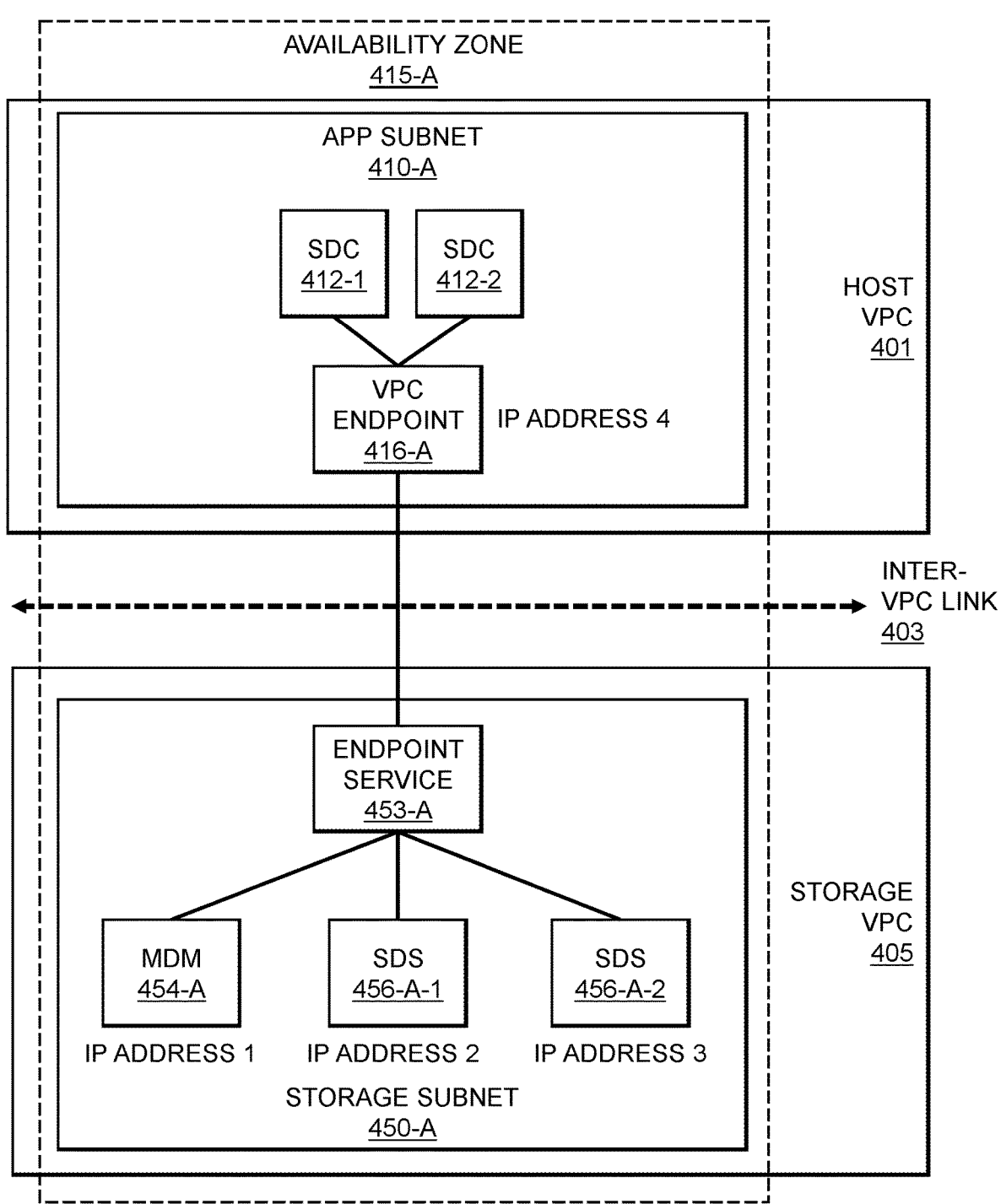
FIG. 4B shows another implementation of a portion of the private cloud deployment of the storage system of FIG. 4A in an illustrative embodiment.

FIG. 4B shows an implementation of the private cloud deployment 400, where the availability zone 415-A utilizes a single VPC endpoint 416-A at the host VPC 401 and a single endpoint service 453-A at the storage VPC 405 side, such that there is only one connection between the host VPC 401 and the storage VPC 405 over the inter-VPC link 403 (e.g., only one load balancer or endpoint service is needed). This is compared with the implementation of FIG. 4A, where multiple VPC endpoints 414-A-1, 414-A-2 and 414-A-3 and multiple endpoint services 452-A-1, 452-A-2 and 452-A-3 are used. Here, both metadata and I/O are passed by the SDCs 412-1 and 412-2 to the MDM 454-A and the SDSs 456-A over the inter-VPC link 403 to the endpoint service 453-A.

As shown in FIG. 4B, the VPC endpoint 416-A is available in the host VPC 401 at IP address 4 (IP_4), and TCP ports may be used to multiplex the MDM 454-A's IP address 1 (IP_1), the SDS 456-A-1's IP address 2 (IP_2) and the SDS 456-A-2's IP address 3 (IP_3). The endpoint service 453-A can translate incoming packets to different destination ports (e.g., IP_4:10000 to IP_2:6602). When one of the SDCs 412-1 and 412-2 connects with the MDM 454-A at IP_4:7711, instead of returning IP_2:6602 for SDS 456-A-1 and IP_3:6602 for SDS 456-A-2, the MDM 454-A can return IP_4:10000 for SDS 456-A-1 and IP_4:10001 for SDS 456-A-2. The endpoint service 453-A translates these to the SDSs 456-A as follows: IP_4:10000→IP_2:6602 and IP_4:10001→IP_3:6602.

The translation of the destination address (and port) for traffic from hosts should be preconfigured in the NAT (e.g., in the endpoint services 452-A or endpoint service 453-A in the examples of FIGS. 4A and 4B), beyond which translation of any source address (and port) for traffic sent back to the hosts is automatically done by the NAT based on observing the source address (and port) used in traffic from the hosts. Also, it should be noted that the technical solutions described herein may apply to different classes of NAT functionality, including NAT functionality which translates both IP addresses and TCP ports as well as NAT functionality which only translates IP addresses where TCP ports are passed through without change.

These and other features of illustrative embodiments are presented by way of example only, and can be varied in other embodiments. For example, the disclosed network address mapping techniques can be implemented using additional or alternative components of one or more hosts, configured to interact with additional or alternative components of storage nodes of a distributed storage system.

Illustrative embodiments disclosed herein can operate with any storage protocol such as those based on NVMe, SCSI and/or iSCSI on any host operating system and with any scale-out distributed storage system configuration.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement hosts and distributed storage systems with network address mapping functionality will now be described in greater detail with reference to FIGS. 5 and 6. Although described in the context of system 100, these platforms may also be used to implement at least portions of other information processing systems in other embodiments.

Figure 5:
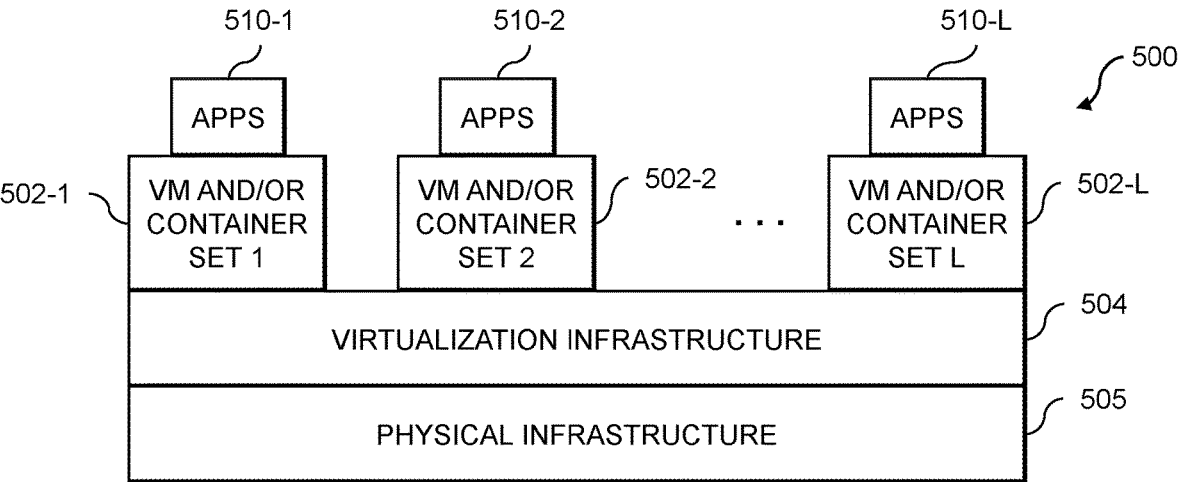
FIGS. 5 and 6 show examples of processing platforms that may be utilized to implement at least a portion of an information processing system in illustrative embodiments.
Figure 6:
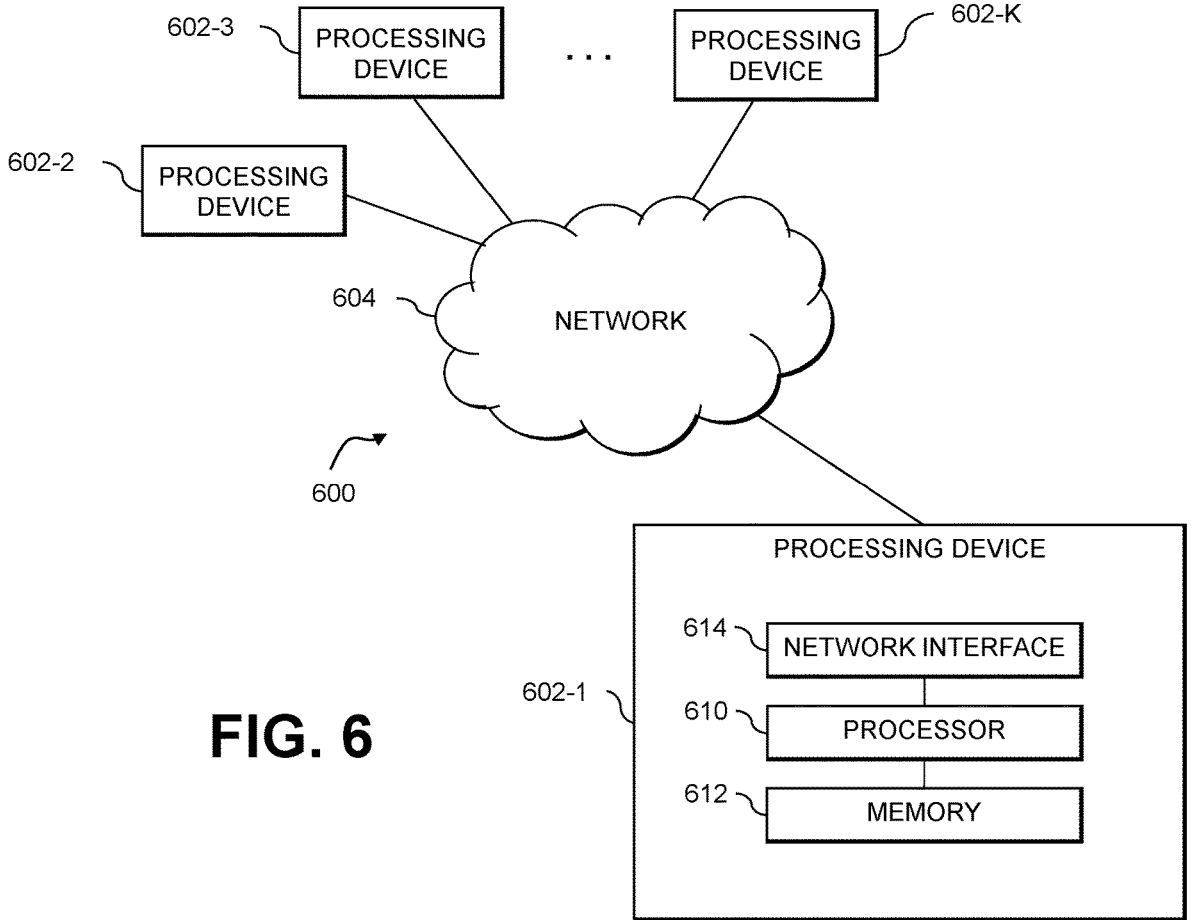

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide network address mapping functionality in a distributed storage system of the type described above using one or more processes running on a given one of the VMs. For example, each of the VMs can implement logic instances and/or other components for implementing network address mapping functionality in the system 100.

A hypervisor platform may be used to implement a hypervisor within the virtualization infrastructure 504. Such a hypervisor platform may comprise an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide network address mapping functionality in a distributed storage system of the type described above. For example, a container host supporting multiple containers of one or more container sets can implement logic instances and/or other components for implementing network address mapping functionality in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the network address mapping functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, hosts, storage systems, storage nodes, storage devices, storage processors and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to determine, as part of a network discovery process for at least one host device operating in a first network which accesses at least one storage node of a storage system operating in a second network, a network address mapping data structure comprising one or more mappings between a first set of one or more network addresses in the first network and a second set of one or more network addresses in a second network;

to associate at least one of the one or more mappings in the network address mapping data structure with an identifier of the at least one host device operating in the first network;

to obtain, at an endpoint service of the storage system operating in the second network, one or more communications to be exchanged between the at least one host device operating in the first network and the at least one storage node operating in the second network;

to modify, by the endpoint service of the storage system operating in the second network, the one or more communications based at least in part on at least one of the one or more mappings in the network address mapping data structure which is associated with the identifier of the at least one host device operating in the first network; and to provide the modified one or more communications from the endpoint service of the storage system operating in the second network to an inter-network link between the first network and the second network;

wherein the one or more communications comprise at least one packet having a header and a payload; and wherein modifying the one or more communications comprises performing, by the endpoint service of the storage system operating in the second network, translation for instances of at least one of (i) one or more of the first set of one or more network addresses in the first network that are present in the payload of the at least one packet and (ii) one or more of the second set of one or more network addresses in the second network that are present in the payload of the at least one packet.

2. The apparatus of claim 1 wherein the at least one packet comprises an Internet Protocol (IP) packet, wherein the inter-network link is configured to perform IP network address translation (NAT) for source and destination network addresses in the header of the IP packet, and wherein modifying the one or more communications based at least in part on at least one of the one or more mappings in the network address mapping data structure comprises modifying said at least one of the one or more of the first set of one or more network addresses in the first network that are present in the payload of the IP packet and the one or more of the second set of one or more network addresses in the second network that are present in the payload of the IP packet.

3. The apparatus of claim 1 wherein the first and second sets of one or more network addresses comprise Internet Protocol (IP) addresses, and wherein the one or more mappings in the network address mapping data structure map between a first set of one or more IP addresses in the first network and a second set of one or more IP addresses in the second network while maintaining Transport Control Protocol (TCP) ports of the first and second sets of one or more network addresses.

4. The apparatus of claim 1 wherein the first and second sets of one or more network addresses comprise Internet Protocol (IP) addresses and Transport Control Protocol (TCP) ports, and wherein the one or more mappings in the network address mapping data structure map between both IP addresses and TCP ports in the first set of one or more network addresses and IP addresses and TCP ports in the second set of one or more network addresses.

5. The apparatus of claim 1 wherein the storage system comprises a distributed storage system comprising a plurality of storage nodes including the at least one storage node.

6. The apparatus of claim 1 wherein the first network comprises a first network subnet associated with a first virtual private cloud on which the at least one host device is deployed, and wherein the second network comprises a second network subnet associated with a second virtual private cloud on which the at least one storage node of the storage system is deployed.

7. The apparatus of claim 1 wherein communication over the inter-network link between the first network and the second network utilizes a Non-Volatile Memory Express over Transport Control Protocol (NVMe/TCP) protocol and wherein the network discovery process comprises a Non-Volatile Memory (NVM) discovery process in the second network to determine one or more NVM ports that are available at one or more network addresses which make one or more NVM namespaces available to the at least one host device.

8. The apparatus of claim 7 wherein the network address mapping data structure comprises an association of a host NVMe qualified name (NON) of the at least one host device with a mapping table comprising at least a subset of the one or more mappings between the first and second sets of one or more network addresses.

9. The apparatus of claim 7 wherein the second set of network addresses comprise NVMe/TCP Transport Addresses and NVMe/TCP Transport Service Identifiers.

10. The apparatus of claim 1 wherein communication over the inter-network link between the first network and the second network utilizes an Internet Small Computer Systems Interface (iSCSI) protocol, and wherein the network discovery process comprises an iSCSI discovery process in the second network.

11. The apparatus of claim 10 wherein the network address mapping data structure comprises an association of a host iSCSI qualified name (IQN) of the at least one host device with a mapping table comprising at least a subset of the one or more mappings between the first and second sets of one or more network addresses.

12. The apparatus of claim 10 wherein the second set of network addresses comprise values of one or more iSCSI TargetAddress text keys.

13. The apparatus of claim 1 wherein the one or more mappings of the network address mapping data structure comprises mappings of respective ones of the first set of one or more network addresses to respective ones of the second set of one or more network addresses, wherein the one or more communications comprise a given communication originating at the at least one host device which is destined for the at least one storage node of the storage system, and wherein modifying the given communication utilizes the one or more mappings of the network address mapping data structure.

14. The apparatus of claim 1 wherein the one or more communications comprise a given communication originating at the at least one storage node of the storage system which is destined for the at least one host device, and wherein modifying the given communication is based at least in part on observing source address information from one or more previous communications originating at the at least one host device which are destined for the at least one storage node of the storage system.

15. The apparatus of claim 1 wherein the network discovery process is performed over an input-output connection between the at least one host device and the at least one storage node.

16. The apparatus of claim 1 wherein the network discovery process is performed over a control path distinct from input-output connections between the at least one host device and the at least one storage node.

17. A computer program product comprising a non-transitory processor-readable storage medium having stored therein program code of one or more software programs, wherein the program code when executed by at least one processing device comprising a processor coupled to a memory, causes the at least one processing device:

to determine, as part of a network discovery process for at least one host device operating in a first network which accesses at least one storage node of a storage system operating in a second network, a network address mapping data structure comprising one or more mappings between a first set of one or more network addresses in the first network and a second set of one or more network addresses in a second network;

to associate at least one of the one or more mappings in the network address mapping data structure with an identifier of the at least one host device operating in the first network;

to obtain, at an endpoint service of the storage system operating in the second network, one or more communications to be exchanged between the at least one host device operating in the first network and the at least one storage node operating in the second network;

to modify, by the endpoint service of the storage system operating in the second network, the one or more communications based at least in part on at least one of the one or more mappings in the network address mapping data structure which is associated with the identifier of the at least one host device operating in the first network; and to provide the modified one or more communications from the endpoint service of the storage system operating in the second network to an inter-network link between the first network and the second network;

wherein the one or more communications comprise at least one packet having a header and a payload; and wherein modifying the one or more communications comprises performing translation for instances of at least one of (i) one or more of the first set of one or more network addresses in the first network that are present in the payload of the at least one packet and (ii) one or more of the second set of one or more network addresses in the second network that are present in the payload of the at least one packet.

18. The computer program product of claim 17 wherein the first and second sets of one or more network addresses comprise Internet Protocol (IP) addresses and Transport Control Protocol (TCP) ports, and wherein the one or more mappings in the network address mapping data structure map between at least one of IP addresses and TCP ports in the first set of one or more network addresses and at least one of IP addresses and TCP ports in the second set of one or more network addresses.

19. A method comprising:

determining, as part of a network discovery process for at least one host device operating in a first network which accesses at least one storage node of a storage system operating in a second network, a network address mapping data structure comprising one or more mappings between a first set of one or more network addresses in the first network and a second set of one or more network addresses in a second network;

associating at least one of the one or more mappings in the network address mapping data structure with an identifier of the at least one host device operating in the first network;

obtaining, by an endpoint service of the storage system operating in the second network, one or more communications to be exchanged between the at least one host device operating in the first network and the at least one storage node operating in the second network;

modifying, by the endpoint service of the storage system operating in the second network, the one or more communications based at least in part on at least one of the one or more mappings in the network address mapping data structure which is associated with the identifier of the at least one host device operating in the first network; and providing the modified one or more communications from the endpoint service of the storage system operating in the second network to an inter-network link between the first network and the second network;

wherein the one or more communications comprise at least one packet having a header and a payload;

wherein modifying the one or more communications comprises performing, by the endpoint service of the storage system operating in the second network, translation for instances of at least one of (i) one or more of the first set of one or more network addresses in the first network that are present in the payload of the at least one packet and (ii) one or more of the second set of one or more network addresses in the second network that are present in the payload of the at least one packet; and wherein the method is performed by at least one processing device comprising a processor coupled to a memory.

20. The method of claim 19 wherein the first and second sets of one or more network addresses comprise Internet Protocol (IP) addresses and Transport Control Protocol (TCP) ports, and wherein the one or more mappings in the network address mapping data structure map between at least one of IP addresses and TCP ports in the first set of one or more network addresses and at least one of IP addresses and TCP ports in the second set of one or more network addresses.

* * * * *